(12) United States Patent
Gindele (10) Patent No.: US 6,985,637 B1
(45) Date of Patent: Jan. 10, 2006

(54) METHOD AND APPARATUS OF ENHANCING A DIGITAL IMAGE USING MULTIPLE SELECTED DIGITAL IMAGES

(75) Inventor: Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 463 days.

(21) Appl. No.: 09/709,692

(22) Filed: Nov. 10, 2000

(51) Int. Cl.
*G06K 9/40* (2006.01)

(52) U.S. Cl. .................... 382/274; 382/167; 348/254; 358/461

(58) Field of Classification Search ................ 382/162, 382/167, 254, 260, 266, 270, 272, 274; 348/251, 348/254; 358/461, 518–523
See application file for complete search history.

(56) References Cited

U.S. PATENT DOCUMENTS

| | | | |
|---|---|---|---|
| 4,862,251 A | 8/1989 | Belmares-Sarabia et al. | |
| 4,945,406 A | 7/1990 | Cok | |
| 5,012,333 A | 4/1991 | Lee et al. | |
| 5,495,539 A | 2/1996 | Sieverding et al. | |
| 5,644,647 A * | 7/1997 | Cosgrove et al. | 382/162 |
| 5,724,456 A * | 3/1998 | Boyack et al. | 382/274 |
| 5,748,342 A * | 5/1998 | Usami | 358/500 |
| 5,987,165 A | 11/1999 | Matsuzaki et al. | |

OTHER PUBLICATIONS

Software program published by EPSON entitled "Film Factory" version 1.0, and the relevant material associated with the program including pp. 1-5 and figures 1-7. Released Jul. 14, 1999 by EPSON Software.*

* cited by examiner

Primary Examiner—Jon Chang
Assistant Examiner—Charles Kim
(74) Attorney, Agent, or Firm—William F. Noval (57) ABSTRACT

A method for deriving enhanced image processing parameters for a source digital image, comprising the steps of: a) providing a source digital image; b) generating at least three rendered digital images from the source digital image with at least one image processing parameter associated with each rendered digital image; c) displaying the rendered digital images on a display; d) selecting two or more of the rendered digital images; and e) using the image processing parameters associated with the rendered digital images to generate enhanced image processing parameters.

12 Claims, 7 Drawing Sheets

METHOD AND APPARATUS OF ENHANCING A DIGITAL IMAGE USING MULTIPLE SELECTED DIGITAL IMAGES

FIELD OF THE INVENTION

The present invention relates to the field of digital imaging, and more particularly to processing an digital image making use user selected digital images.

BACKGROUND OF THE INVENTION

Some interactive digital imaging software applications have been designed and implemented that allow the user to view multiple renditions of a source digital image on a monitor and select a most pleasing rendition. Specifically, applications have been employed where the multiple renditions represent different balances of the source digital image, i.e. different brightness renditions or different color renditions. The user when presented with the multiple renditions selects one of the renditions. This type of user interactive display is sometimes referred to as a ring-a-round when a default rendition of the source digital image is displayed in a center position with rendition variations presented about the center position. The digital imaging application then records the user's rendition selection and uses the corresponding image processing parameters associated with the rendition selection to enhance the source digital image.

One of the problems with current multiple rendition digital imaging applications is experienced when the ideal rendition of the digital image is not represented by one of the displayed renditions. For this case the user must select the rendition closest to the hypothetical ideal rendition. Other types of user interactive applications use slider bars or numerical input parameters that allow a user to fine tune the image characteristics of the final image rendition. These types of user interface mechanisms are sometimes difficult to use or may be slow due to the image processing required to generate the next rendition of the digital image for viewing.

What is needed is a user interface that combines the ease of use characteristics of the multiple rendition design interface with the fine tuning characteristics of the slider bar design interface.

SUMMARY OF THE INVENTION

According to the present invention there is provided a solution to the problems discussed above.

According to a feature of the present invention there is provided a method for deriving enhanced image processing parameters for a source digital image, comprising the steps of:
 a) providing a source digital image;
 b) generating at least three rendered digital images from the source digital image with at least one image processing parameter associated with each rendered digital image;
 c) displaying the rendered digital images on a display;
 d) selecting two or more of the rendered digital images; and
 e) using the image processing parameters associated with the rendered digital images to generate enhanced image processing parameters.

ADVANTAGEOUS EFFECT OF THE INVENTION

The invention has the following advantages.
 1. A user interface for a display that displays a source digital image that combines the ease of use characteristics of a multiple rendition design interface with the fine tuning characteristics of a slider bar design interface.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected form such systems, algorithms, components, and elements known in the art. Given the description as set forth in the following specification, all software implementation thereof is conventional and within the ordinary skill in such arts.

Description of an Image and a Digital Image

An image can refer to any form of visual information in recorded or displayed form. Examples of recorded images may include, but are not limited to, a photographic film negative, a photographic film transparency, a motion picture film, and a photographic print. Displayed forms of images may include, but are not limited to, visual presentations made on electronic displays such as CRT monitors, LCD panels, electroluminescent devices, and LASER projection systems.

A digital image is comprised of one or more digital image channels. Each digital image channel is comprised of a two-dimensional array of pixels. Each pixel value relates to the amount of light received by the image capture device 10 (FIG. 2) corresponding to the geometrical domain of the pixel. For color imaging applications a digital image will typically consist of red, green, and blue digital image channels. Although the preferred embodiment of the present invention is practiced with digital images produced with a capture device 10, the present invention is not limited to pixel data relating to photographs. For example, graphic or other synthetic data may be merged with photographically captured pixel data and still be considered a digital image. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention may be applied to, but is not limited to, a digital image for any of the above mentioned applications. Although the present invention describes a digital image channel as a two dimensional array of pixel values arranged by rows and columns, those skilled in the art will recognize that the present invention can be applied to mosaic (non rectilinear) arrays with equal effect.

Description of a Image Capable Computer

Figure 2:
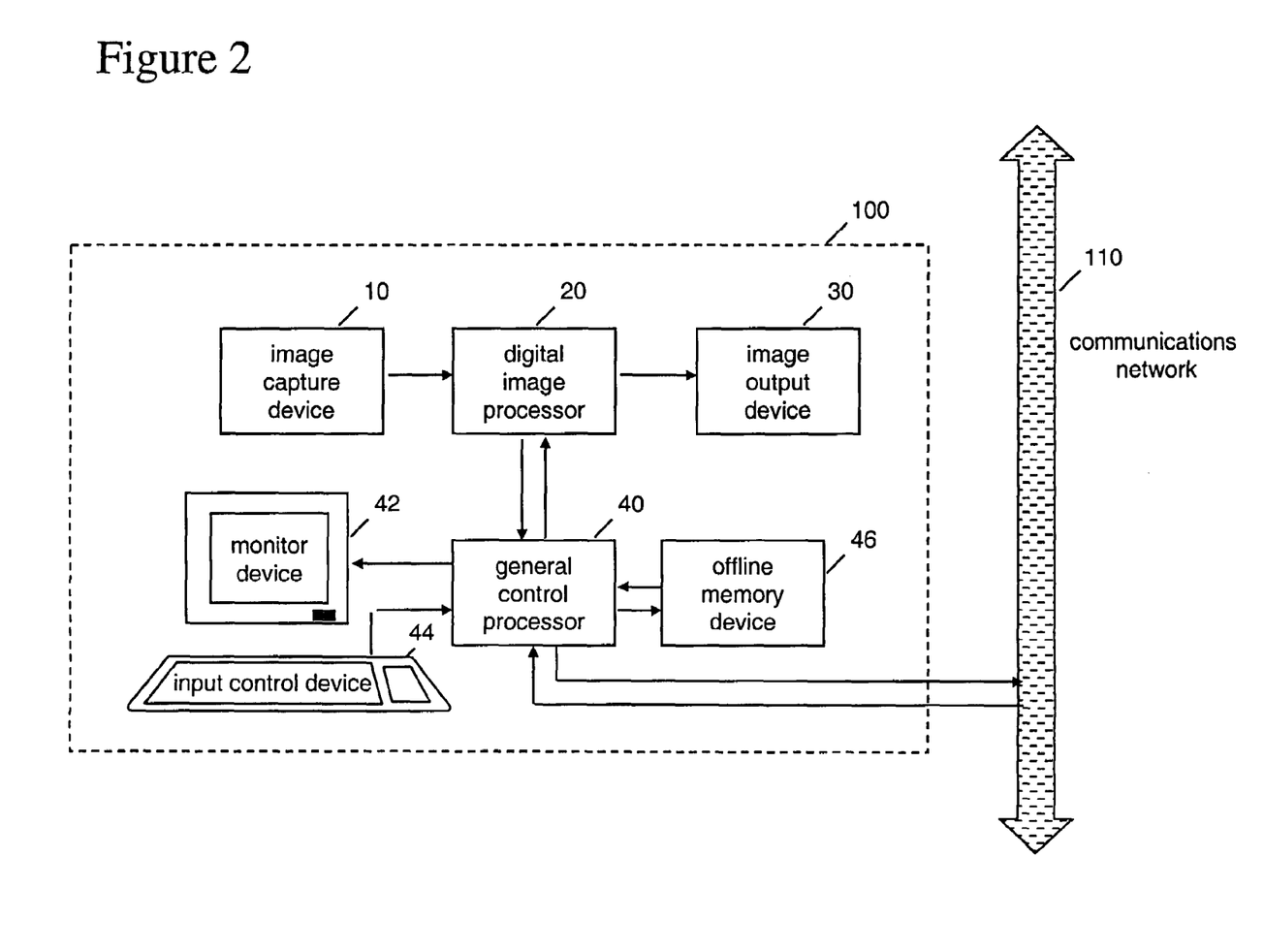
FIG. 2 is a block diagram showing a computer which includes a digital image processor.
Figure 3:
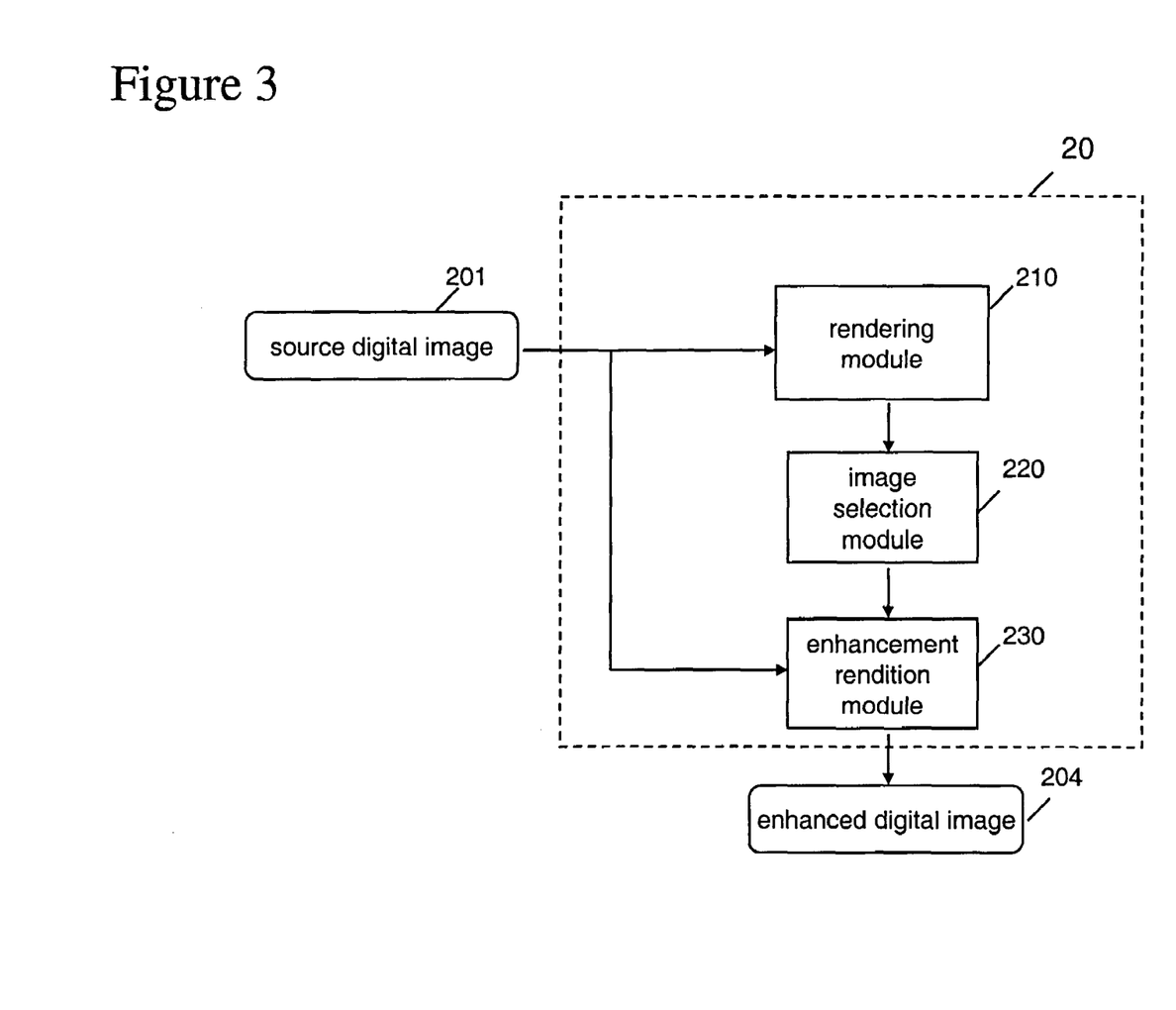
FIG. 3 is a block diagram showing the details of the digital image processor.

The present invention may be implemented in a combination of computer hardware software as shown in FIG. 3 within an image capable computer 100 as shown in FIG. 2. Although the preferred embodiment of the present invention is practiced with a personal computer, any image capable computer 100 can perform the tasks required of the present invention such as but not limited to a hand held computer, kiosk computer, laptop computer, or a computer remotely connected via a communications network 110. The following description relates to a digital imaging system as a subset of the components of a personal computer 100 which includes an image capture device 10, a digital image processor 20, an image output device 30, and a general control processor 40. The system includes a monitor device 42 for viewing digital images. The system also includes an input control device 44 such as a keyboard and or mouse pointer. The input control device 44 is used to make selections of digital image displayed on the monitor device 42.

The digital image processor 20 may be used with digital images derived from a variety of imaging devices. For example, the image capture device 10 can be a conventional photographic film camera combined with a film scanner device. The photographic film camera captures a scene on photographic film negative or photographic film transparency and a film scanner device for scanning the developed image on the film and producing a digital image. The present invention can also be used with other image capture devices 10; such as but not limited to, digital cameras and print scanners. The digital image processor 20 provides the means for processing the digital images to produce pleasing looking images on the intended output device or media or alternatively, for analyzing the content of processed digital images. Although a single image output devices 30 is shown, the present invention may be used in conjunction with a variety of image output devices 30 which may include, but not limited to, a digital photographic printer. Those skilled in the art will recognize that the present invention is not limited to just these mentioned image processing modules.

The general control processor 40 shown in FIG. 2 may store the present invention as a computer program stored in a computer readable storage medium. The computer readable storage medium may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 46.

It should also be noted that the present invention implemented in a combination of software and/or hardware is not limited to devices that are physically connected and/or located within the same physical location. One or more of the devices illustrated in FIG. 2 may be located remotely and may be connected via a wireless connection.

Description of a Image Processor

The digital image processor 20 shown in FIG. 2 is illustrated in more detail in FIG. 3. The rendering module 210 receives a source digital image 201 and produces two or more rendered digital images from the source digital image 201. These rendered digital images represent the image content of the source digital image 201 with some image characteristic, such as brightness or color, having been modified. The rendered digital images are then displayed on the monitor device 42. The user of the system then makes selections with an input control device 44 of two or more of the rendered digital images in step 220. The rendered digital image selection information is then passed on to the enhancement rendition module 230. Associated with the rendered digital images are corresponding image processing parameters that were used by the rendering module 210 to produce the rendered digital images. The image processing parameters corresponding to the selected rendered digital images are also passed on to the enhancement rendition module 230. The enhancement rendition module 230 uses the image processing parameters to generate one or more enhanced image processing parameters. The enhanced image processing parameters are used by the enhancement rendition module 230 to process the source digital image 201 to produce an enhanced digital image 204. Alternatively, the enhanced image processing parameters may be attached to, or stored with, the source digital image 201 as meta-data, i.e. non-pixel information associated with a digital image. The source digital image 201 with the attached meta-data can then be transmitted via the communications network 110 to a remote computer that uses the source digital image 201 and the attached meta-data to produce an enhanced digital image 204.

Figure 4:
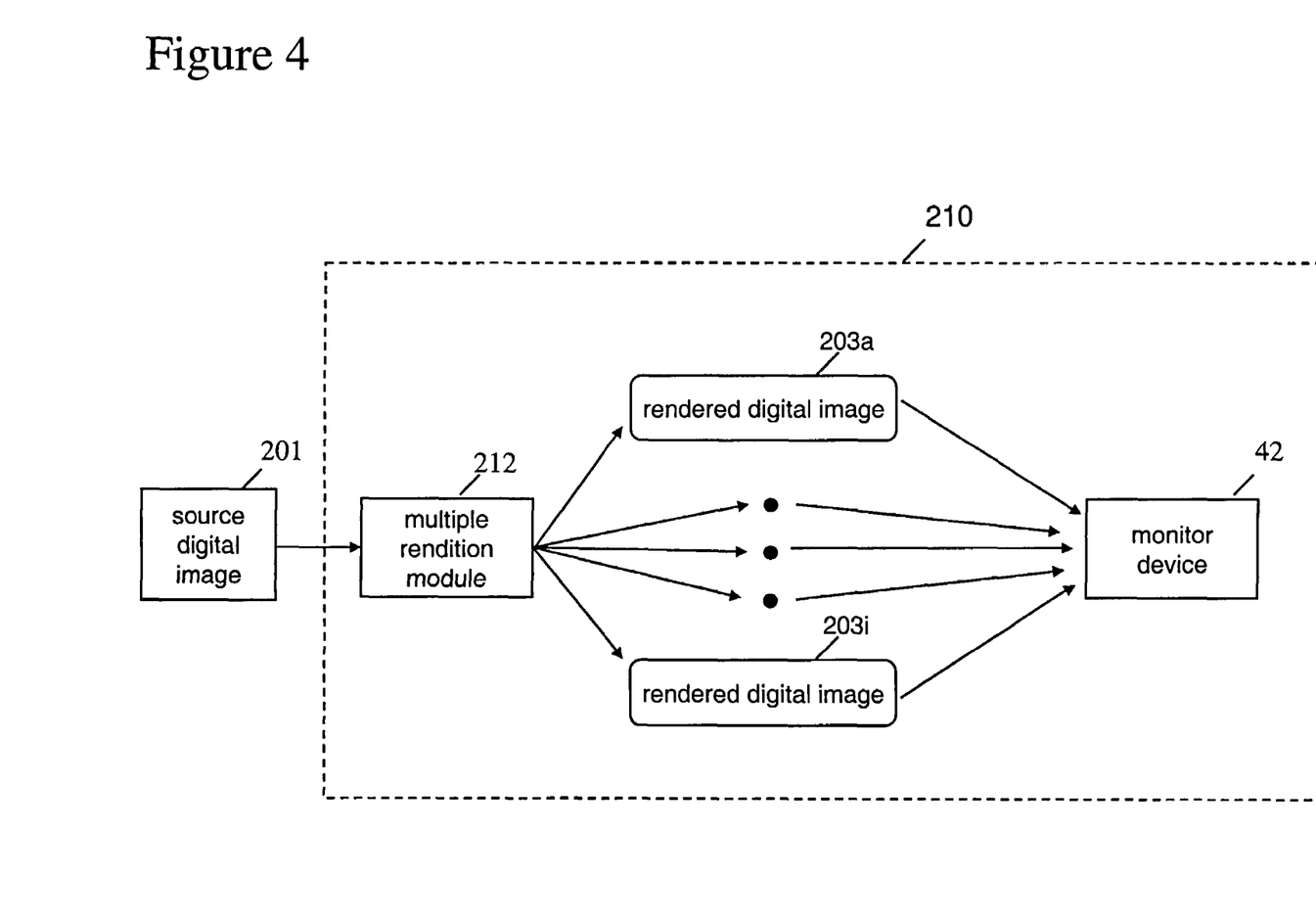
FIG. 4, is a block diagram showing the details of the render module.

The rendering module 210 shown in FIG. 3 is illustrated in more detail in FIG. 4. The source digital image 201 is received by the multiple rendition module 212 which produces more than one rendered digital image. The multiple rendered digital images 203a–203i differ from one another is at least one visual characteristic. For example, the preferred embodiment of the present invention varies the overall brightness characteristic of the multiple rendered digital images. However, it should be recognized by those skilled in the art that the present invention can be practiced in a form where the multiple rendered digital images vary in some other visual characteristic, such as but not limited to, color, tone scale, or contrast. The multiple rendered digital images 203a–203i are then displayed on a monitor device 42.

Figure 5:
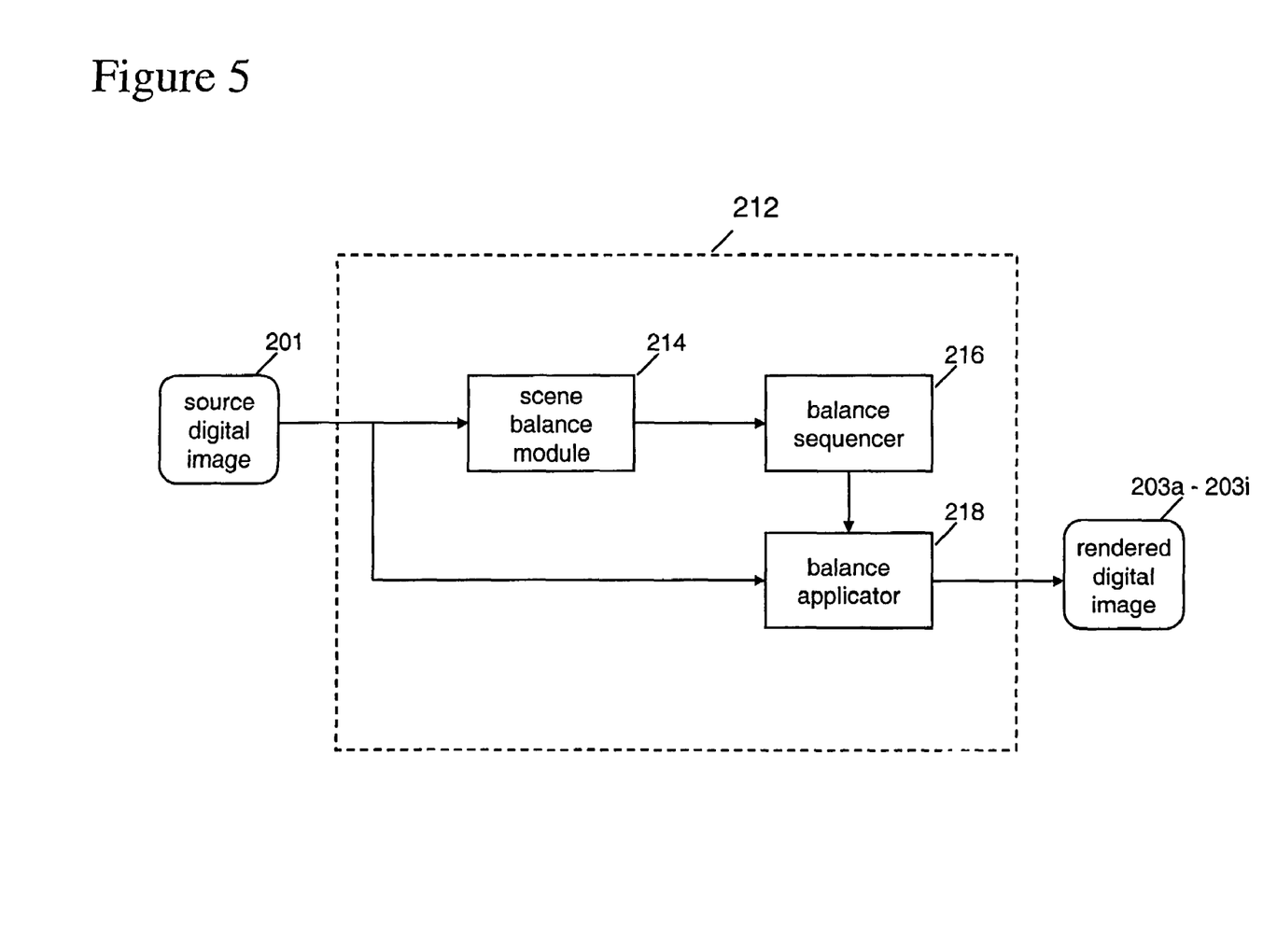
FIG. 5 is a block diagram showing the details of the multiple rendition module.

The multiple rendition module 212 shown in FIG. 4 is illustrated in more detail in FIG. 5. The source digital image 201 is received by the scene balance module 214. The scene balance module 214 calculates an adjustment for the overall brightness and color of the source digital image 201. The present invention may be practiced with any scene balance module such as the one described by Cok et al. in U.S. Pat. No. 4,945,406. The scene balance module calculates overall balance values, i.e. pixel values corresponding to a theoretical 20% gray card reflector. The present invention may also be practiced with a scene balance module that involves the user to manually adjust balance of the source digital image 201. For this alternative embodiment of the present invention the scene balance module 214 substitutes a manual user interface for the automatic calculation logic.

The balance sequencer 216 receives the overall balance values corresponding to the source digital image 201 and generates a set of additional balance values. Each additional balance value will correspond to a specific rendered digital image 203. An equal number of additional balance values are calculated which are numerically higher and lower than the overall balance value in equal increments of brightness. For example, if the overall balance value for the source digital image 201 is code value 1000, the additional balance values of 900, 800, 700, and 600 are calculated corresponding to progressively lighter rendered digital images 203. Similarly, the additional balance values of 1100, 1200, 1300, and 1400 are calculated corresponding to progressively darker rendered digital images 203. The overall balance value and the additional balance values are received by the balance applicator 218 which produces a rendered digital image 203a–203i corresponding to each balance value.

Figure 1:
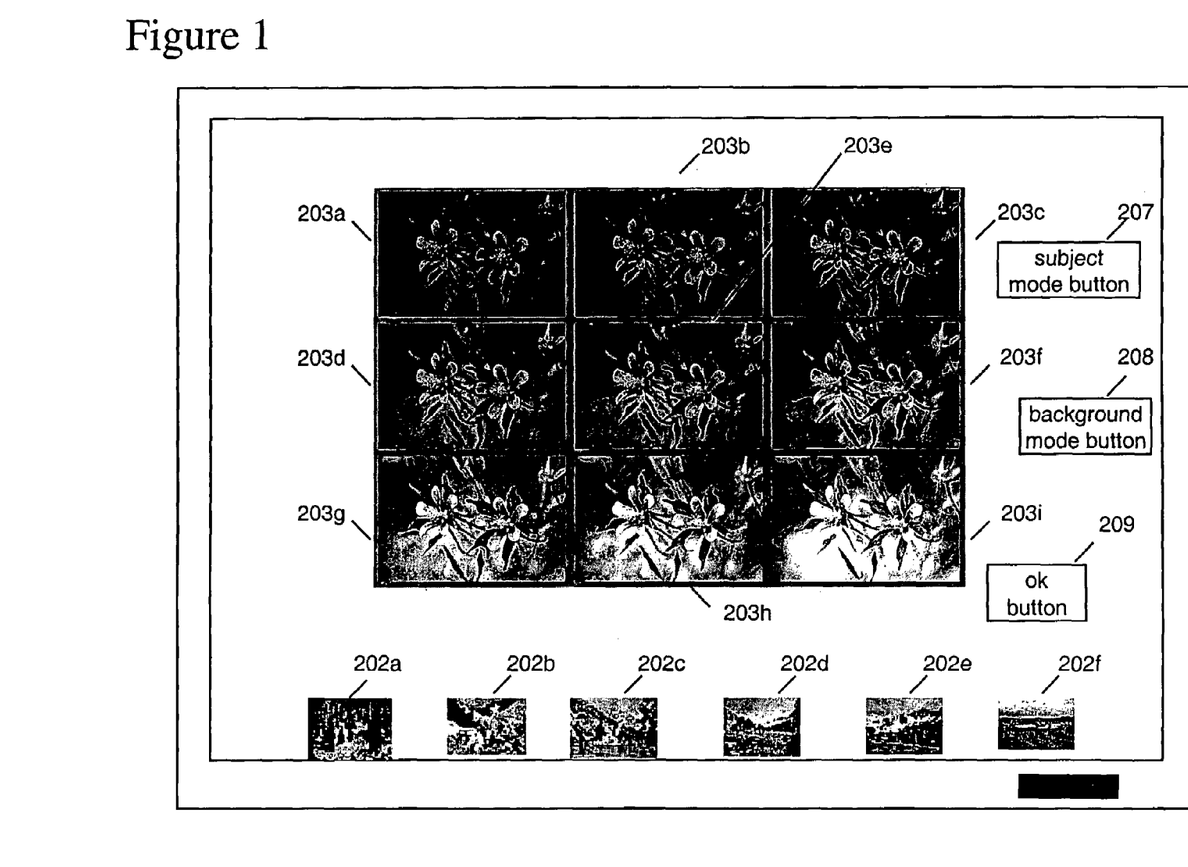
FIG. 1 is a pictorial diagram showing a display of digital images produced by the present invention.

The details of the image selection module 220 shown in FIG. 3 is described in more detail below. For the example given above, the nine rendered digital images 203a–203i are displayed on a monitor device 42 as illustrated in FIG. 1. The digital images are arranged from darkest to lightest with the rendition corresponding to the overall balance value displayed in the middle. The user is allowed to interact with the display by making one or more selections of the rendered digital images 203a–203i with a selection input control device 44 such as a keyboard or mouse. The user is instructed be make a first selection based on the rendition for which the main subject of the source digital image is best rendered. This can be accomplished in a variety of ways. The preferred embodiment of the present invention uses a help message that is displayed on the monitor device 42. The user views all of the rendered digital images 203a–203i and makes a first selection by placing the display cursor over the intended rendered digital image 203a–203i and clicking with the mouse. The user is also instructed to select another rendered digital image 203a–203i for which non-subject regions of the source digital image 201 is better rendered than in the first selection. The user then makes a second selection. The user is allowed to select the OK button 209 at any time. If the use determines that the first selected rendered digital image 203a–203i is a also the best rendition for the non-subject regions of the image, the user can select the OK button 209 which results in no second selection. The selections made by the user are recorded by the digital image processor.

In the preferred embodiment of the present invention the user is requested to make a maximum of two selections but is allowed to make only one selection. If the user does make two selections, the system automatically terminates the selection process. The preferred embodiment of the present invention is primarily designed to work well in a semi-automated environment. The user, or operator, of the system, can achieve a better overall productivity of producing enhanced digital images if the next source digital image to be processed is automatically displayed on the monitor device 42 in the multiple rendition mode after the selection process associated with the last source digital image has been completed.

In an alternative embodiment of the present invention the user must select a button which is displayed on the monitor device 42 before making selections of the multiple rendered digital images. Referring to FIG. 1, the user can select the subject mode button 207 or the background mode button 208 by clicking with the mouse when the cursor is positioned over the display button. In this alternative embodiment the order of selecting rendered digital images is controlled by the user. However, the user must first select one of the mode buttons and then make a selection of a rendered digital image related to the mode. In another alternative embodiment the user must only select a mode button once. For example, the user selects the background mode button 208 first and then makes a rendered digital image selection. The use then makes another rendered digital image selection which is automatically interpreted by the digital image processor as relating to the other mode.

In another alternative embodiment of the present invention the user is instructed to make multiple selections of the same rendered digital image. For this embodiment, the enhanced digital image is produced by interpolating between two selections of rendered digital images. In the example illustrated in FIG. 1, the nine rendered digital images represent different renditions of the source digital image which vary in their in brightness characteristic. If the user prefers a rendered digital image with a brightness characteristic which is in between those displayed on the monitor device 42, the user can select one of the rendered digital images more than once to indicate that the preferred rendition is closer to that of the rendered digital image which was selected multiple times. A weighted average of the image processing parameters is calculated using the number of times a rendered digital image is selected as the weighting factor. Thus with this alternative embodiment of the present invention the user can control the rendition of the final enhanced digital image with greater precision than merely having to select from the choices presented automatically.

Enhancement Rendition Module.

Figure 6:
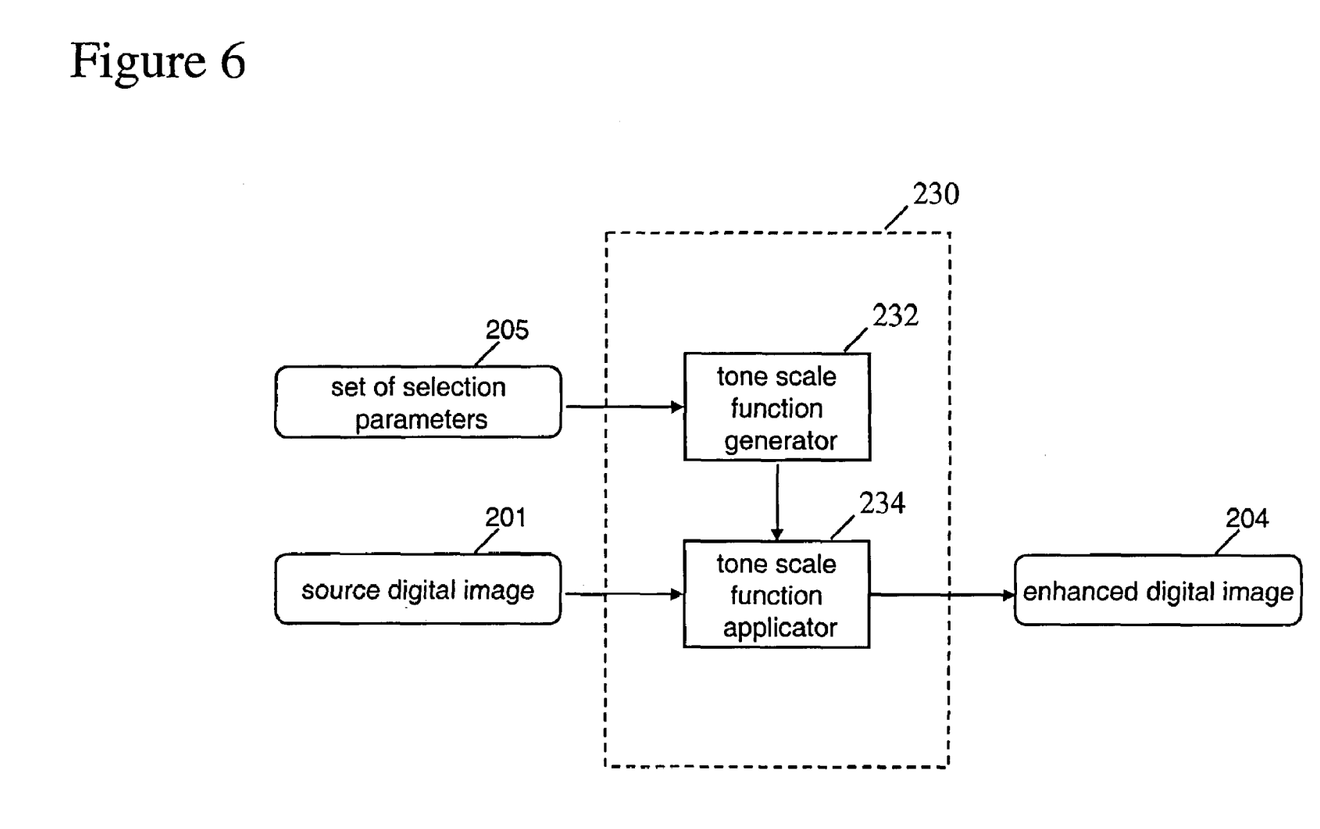
FIG. 6 is a block diagram showing the details of the enhancement rendition module.

The enhancement rendition module 230 shown in FIG. 3 is illustrated in more detail in FIG. 6. The balance values corresponding to the first and second selected rendered digital images 203a-203i constitute a set of selection parameters 205 that is received by the tone scale function generator 232. The set of selection parameters 205 is used by the tone scale function generator 232 to calculate a rendering tone scale function. The tone scale function applicator 234 applies the rendering tone scale function to the source digital images 201 to produce an enhanced digital image 204.

The preferred embodiment of the present invention uses a tone scale function to produce the enhanced digital image 204. The simplest form of a tone scale function is a single valued function that is used to map input pixel values to output pixel values. The shape of the rendering tone scale function applied to the source digital image 201 determines the visual differences between the source digital image 201 and the enhanced digital image 204. It should be noted that although the preferred embodiment of the present invention uses a single valued function in the form of a one-dimensional look-up-table (LUT), those skilled in the art will recognize that other forms of tone scale functions, such as three-dimensional LUT's can also be constructed and practiced with the present invention.

The mathematical formulation of the LUT values that constitute the rendering tone scale function is as follows. Let y represent the output LUT value associated with the LUT index value x. The range in x values, i.e. the length of the and extent of the numerical range of the LUT, depends on the type of image data to be processed. For 12-bit digital imaging applications the range in x values is from 0 to 4095.

Figure 7:
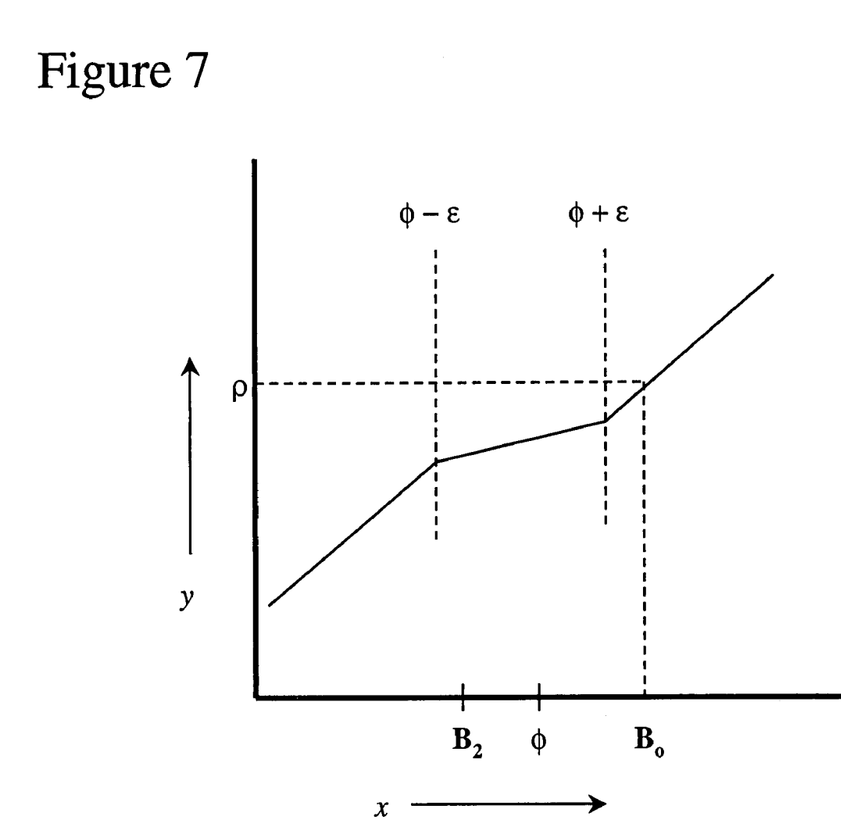
FIG. 7 shows a graph of a rendering tone scale function produced by the present invention.

Let the value $\rho$ represent the reference gray value of the digital imaging application system that corresponds to a reference, or calibrated gray point. The mathematical formula for the numerical value y placed in the LUT at index x is divided into three zones depending on the index value x. and whether the second balance value is higher or lower than the overall balance value. For the case in which the second balance value is numerically lower than the overall balance value, the formula is given by:

$$y = x + (\rho - B_o) + (B_o - B_2)\gamma \quad (1)$$

and $\gamma = 0$ for $x >= \phi + \epsilon$ $\gamma = 1$ for $x <= \phi - \epsilon$ $\gamma = (x - \phi - \epsilon)/(2\epsilon)$ for $\phi - \epsilon < x < \phi + \epsilon$ where $B_o$ represents the overall balance value, $B_2$ represents the second balance value, and $\phi$ represents a the midpoint of the transition zone and E represents the half width of the transition zone. The rendering tone scale function y(x) is shown in graphical form in FIG. 7. In similar form, if the second balance value $B_2$ is numerically higher than the overall balance value $B_o$, the mathematical form is given by:

$$y = x + (\rho - B_o) + (B_o - B_2)\gamma \quad (2)$$

and $\gamma = 0$ for $x >= \phi - \epsilon$ $\gamma = 1$ for $x >= \phi + \epsilon$ $\gamma = (\phi + \epsilon - x)/(2\epsilon)$ for $\phi - \epsilon < x < \phi + \epsilon$ The mathematical formulation of the rendering tone scale function employed by the preferred embodiment of the present invention is designed to compress the dynamic range of the pixel image data. More photographed natural scenes are too high in dynamic range than too low. When the user selects the first rendered digital image the overall balance value is determined. This process sets the overall brightness for the main subject of the image. When the user selects the second rendered digital image it is assumed that source digital image is too high in dynamic range. Therefore, a compressive tone scale function is calculated from the overall balance value and the second balance value. When the rendering tone scale function illustrated in FIG. 7 is applied to the source digital image, different regions of the image will experiment different amounts of brightness changes depending on the code value of the image pixels. The darkest regions of the source digital image 201 will experience more brightness change than the lightest regions based on the shape of the rendering tone scale function. The resultant enhanced digital image 204 generated will have a reduced dynamic range relative to the source digital image 201, i.e. the shadow or dark regions of the image will appear lighter.

The rendering tone scale function is applied to the source digital image 201 by the tone scale function applicator 234 as shown in FIG. 6. The preferred embodiment of the present invention applies the rendering tone scale function to a luminance digital image channel constructed from the source digital image 201. The red, green, blue digital image channels composing the source digital image 201 are transformed into a luminance-chrominance domain. The rendering tone scale function is applied to the luminance channel producing a tone scaled luminance digital image channel. The a tone scaled luminance digital image channel and the chrominance digital image channels are then transformed back into the red-green-blue domain constituting the enhanced digital image 204. Those skilled in the art will recognize that the present invention can be practiced with many different forms of luminance-chrominance domain transforms and their corresponding inverse transforms.

The luminance-chrominance transform employed by the present invention utilizes a linear 3 by 3 matrix transform. Let $R_{ij}$, $G_{ij}$, and $B_{ij}$ refer to the pixel values corresponding to the red, green, and blue digital image channels located at the $i^{th}$ row and $j^{th}$ column. Let $L_{ij}$, $C1_{ij}$, and $C2_{ij}$ refer to the transformed pixel values of the modified digital image. The 3 by 3 matrix transformation relating the input and output pixel values is as follows:

$$L_{ij} = \tau_{11}R_{ij} + \tau_{12}G_{ij} + \tau^{13}B_{ij} \quad (3)$$

$$C1_{ij} = \tau_{21}R_{ij} + \tau_{22}G_{ij} + \tau_{23}B_{ij}$$

$$C2_{ij} = \tau_{31}R_{ij} + \tau_{32}G_{ij} + \tau_{33}B_{ij}$$

where the $\tau_{mn}$ terms are the coefficients of the 3 by 3 LCC matrix denoted by [$\tau$]. The constants employed by the present invention for $\tau_{11}$, $\tau_{12}$ and $\tau_{13}$ are 0.333, 0.333 and 0.333 respectively. It is important to note that the present invention may be practiced with other luminance chrominance transformation and still yield good results. For example, a matrix with $\tau_{11}$, $\tau_{12}$ and $\tau_{13}$ values set to 0.30, 0.59, and 0.11 respectively also works well.

The preferred embodiment of the present invention applies the rendering tone scale function, in the form of a look-up-table, directly to the pixels of the luminance digital image channel of the source digital image 201. This method is preferred primarily for its computational efficiency properties. An alternative embodiment of the present invention employs a method of applying a tone scale function disclosed by Lee et al. in U.S. Pat. No. 5,012,333 for improved image quality results. Although Lee et al. describe a method for interactively modifying image attributes, the present invention employs the method of applying tone scale functions to digital images based on spatial filtering techniques. This method involves spatially filtering the luminance digital image channel resulting two spatial frequency components, (high and low components), applying the tone scale function to the low spatial frequency component, and combining the tone scale modified low spatial frequency component with the high spatial frequency component. The resulting processed digital image has enhanced brightness and contrast attributes with improved spatial detail content.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

Each computer readable storage medium can comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

What is claimed is:

1. A method for deriving enhanced image processing parameters for a source digital image, comprising the steps of:
    a) providing a source digital image;
    b) generating at least three rendered digital images from the source digital image with at least one image processing parameter associated with each rendered digital image;
    c) displaying the rendered digital images on a display;
    d) selecting two or more of the rendered digital images;
    e) using the image processing parameters associated with the rendered digital images to generate enhanced image processing parameters, including a compressed tone scale function wherein different regions of an enhanced image have different brightness ranges; and
    f) displaying a message on the display indicating that one selection of a rendered digital relates to the main subject of the source digital image and another selection of a rendered digital image relates to the background of the source digital image.

2. The method of claim 1 further including the step of storing enhanced image processing parameters with the source digital image as meta-data.

3. The method of said claim 1 wherein one of selected rendered digital images is selected at least twice and the enhanced image processing parameters associated with the selected rendered digital images are a function of the number of times of said at least twice selected rendered digital images is selected.

4. The method of claim 1, further including the step of selecting a mode button on the display before each selection of a rendered digital image.

5. A method for generating an enhanced digital image from a source digital image, comprising the steps of:
    a) providing a source digital image;
    b) generating at least three rendered digital images from the source digital image with at least one image processing parameter associated with each rendered digital image;
    c) displaying the rendered digital images on a display;
    d) selecting two or more of the rendered digital images;
    e) using the image processing parameters associated with the rendered digital images to generate an enhanced digital image from said source digital image, wherein said enhanced digital image has a compressed tone scale function wherein different regions of said enhanced image have different brightness ranges; and
    f) displaying a message on the display indicating that one selection of a rendered digital relates to the main subject of the source digital image and another selection of a rendered digital image relates to the background of the source digital image.

6. The method of claim 5, further including the step of selecting a mode button on the display before each selection of a rendered digital image.

7. Apparatus for deriving enhanced image processing parameters for a source digital image, comprising:
    a) means for providing a source digital image;
    b) means for generating at least three rendered digital images from the source digital image with at least one image processing parameter associated with each rendered digital image;
    c) means for displaying the rendered digital images on a display;
    d) means for selecting two or more of the rendered digital images;
    e) means for using the image processing parameters associated with the rendered digital images to generate enhanced image processing parameters, including a compressed tone scale function wherein different regions of an enhanced image have different brightness ranges; and
    f) means for displaying a message on the display indicating that one selection of a rendered digital relates to the main subject of the source digital image and another selection of a rendered digital image relates to the background of the source digital image.

8. The apparatus of claim 7 wherein one of selected rendered digital images is selected at least twice and the enhanced image processing parameters associated with the selected rendered digital images are a function of the number of times of said at least twice selected rendered digital images.

9. The apparatus of claim 7, further including means for selecting a mode button on the display before each selection of a rendered digital image.

10. Apparatus for generating an enhanced digital image from a source digital image, comprising:
    a) means for providing a source digital image;
    b) means for generating at least three rendered digital images from the source digital image with at least one image processing parameter associated with each rendered digital image;
    c) means for displaying the rendered digital images on a display;
    d) means for selecting two or more of the rendered digital images;
    e) means for using the image processing parameters associated with the rendered digital images to generate an enhanced digital image from said source digital image, wherein said enhanced digital image has a compressed tone scale function and wherein different regions of said enhanced image have different brightness ranges; and
    f) means for displaying a message on the display indicating that one selection of a rendered digital relates to the main subject of the source digital image and another selection of a rendered digital image relates to the background of the source digital image.

11. The apparatus of claim 10 wherein one of selected rendered digital images is selected at least twice and the enhanced image processing parameters associated with the selected rendered digital images are a function of the number of times of said at least twice selected rendered digital images.

12. The apparatus of claim 10, further including means for selecting a mode button on the display before each selection of a rendered digital image.

* * * * *